Patented July 24, 1951

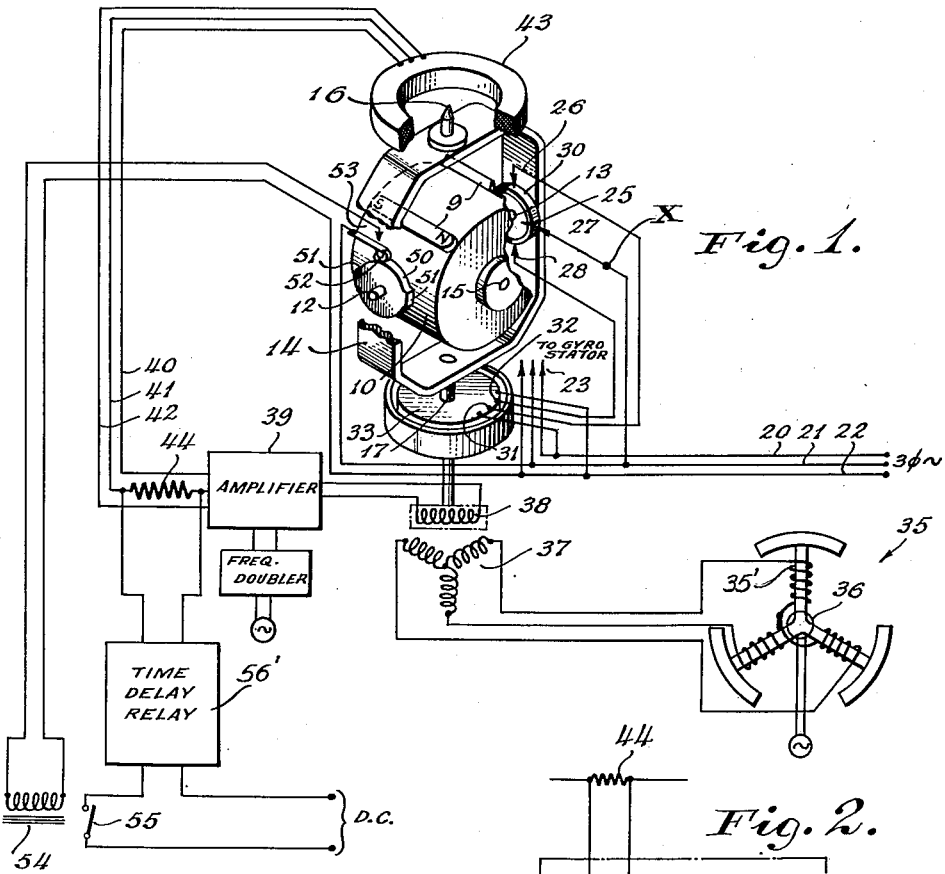
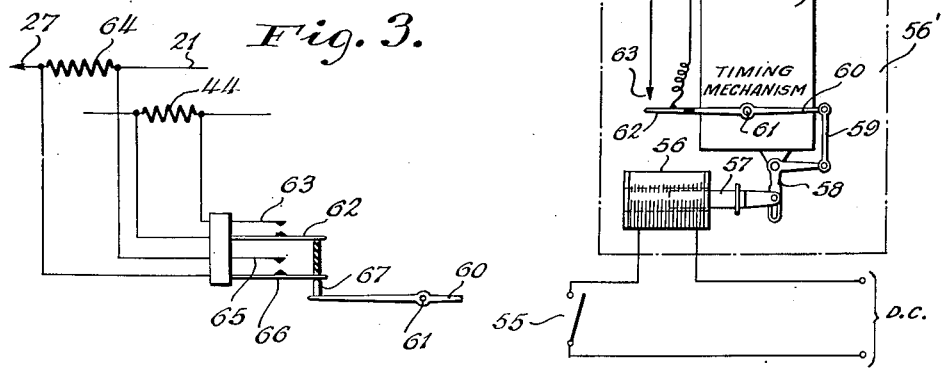

2,561,367

UNITED STATES PATENT OFFICE 2,561,367

GYROSCOPE CONTROL SYSTEM

Robert Haskins, Jr., Garden City, N. Y., assignor to The Sperry Corporation, a corporation of Delaware Application March 8, 1944, Serial No. 525,539

21 Claims. (Cl. 74—5.4)

This invention relates to gyroscope controlling means and has for its object the provision of a simplified arrangement for restoring gyroscopes to a normal position.

The invention is adapted for use with a gyroscope system, particularly one in which the gyroscope is controlled by some primary standard of position, for example, a flux valve or other form of magnetic compass, a pendulum or the like, and in which means become effective when the axis of rotation of the gyroscope has been displaced to restore the same to normal position. When such systems are used on airplanes subject to violent maneuvering or acrobatics, the gyroscope may pass through a position approaching gimbal lock with consequent tumbling causing a serious disturbance of the gyroscope, and the conventional restoring means has been found undesirably slow in restoring the gyroscope to its proper position after such disturbance. Abnormal positions of the gyroscope are also likely to be present when originally starting up the gyroscope, because of which it is desirable to restore the gyroscope to its normal position more quickly than would be effected by the normal synchronizing torque.

The present invention contemplates the application of a torque to the gyroscope such as to cause an abnormally high precession rate, at least about the horizontal axis of the gyroscope, which becomes effective when the spin axis of the gyroscope has been displaced through a predetermined angular distance from its normal position, regardless of the cause of such displacement so that quick resetting is assured. My invention also contemplates applying an increased resetting torque about the vertical axis of the gyro to quickly level the gyroscope at the same time.

A preferred embodiment, showing the invention as applied to a directional gyroscope will now be described with the aid of the accompanying drawings, of which:

Fig. 1 shows schematically a circuit arrangement of a gyroscope system including one embodiment of the present invention:

Fig. 2 is a detail of the time delay relay, and

Fig. 3 shows a modification of the circuits controlled by the relay.

Referring to the drawings: The gyroscope of the present embodiment of the invention is contained in a casing 10 supported by pivots 12 and 13 in gimbal ring 14 so that the spin axis 15 of the rotor is in a horizontal position. Gimbal or vertical ring 14 is pivoted in a supporting casing (not shown) in the usual manner on a vertical axis defined by upper pivot 16 and depending pivot shaft 17.

In the present embodiment, a three-phase source of potential (not shown) is used to energize wires 20, 21 and 22. The arrows 23 indicate leads for supplying power in the usual manner for driving the gyroscope rotor.

In order to overcome tilting of the gyro due to rotation of the earth or other disturbing effects, the gyro is provided with a leveling system which forces the spin axis to maintain a level position with respect to the frame. A conventional leveling system shown in the drawings will be described briefly.

A switch comprising an insulating disc 25 secured to pivot 13 so as to rotate therewith, carrying on its edge a metal strip 30 that cooperates with three stationary contacts, 26, 27 and 28 mounted on vertical ring 14, is used to control the leveling system. Contact 27 is connected to wire 21 of the source of potential and supplies current therefrom to metal strip 30.

The outer switch contacts 26 and 28 are connected to terminals 31 and 32 of rotor 33 of a torque motor secured to depending pivot 7, which is shown as of the pancake type more fully shown and described in the copending patent of A. W. Lane and R. S. Curry, Jr., No. 2,389,158 for Controller for Gyro Instruments, dated November 20, 1945. The stator 33' is connected to supply leads 20 and 22 and cooperates with said rotor. When the apparatus is normally positioned as shown in the drawings, both of the outer stationary contacts 26 and 28 are in engagement with segment 30 and the circuits of the motor are in balance and no torque is exerted on the rotor. When the spin axis is moved for any reason from its level position, the energizing circuit for the torque motor will be opened at either contact 26 or 28 which will cause an unbalance in the circuit causing a torque of suitable direction to be exerted on pivot or trunnion 17 until the spin axis is again in level position and both contacts 26 and 28 are in engagement with segment 30.

A gyro-magnetic compass system is disclosed, in which the directional gyroscope is of the "slave" type, that is, it is forced to indicate direction in the present instance, with respect to a magnetic compass 35, which is shown as of the flux value type. Such an arrangement is disclosed in the co-pending application of Esval and Frische, now Patent No. 2,357,319, dated September 5, 1944. The flux valve acts as the responsive unit which "senses" heading with respect to the earth's magnetic meridian. The heading sensed by a flux valve, or valves is transmitted to the signal transformer 37—38, which may be of the Selsyn type which is mechanically coupled to shaft 17 of the gyro. Any deviation between the indicated and magnetic heading originates a signal voltage in the rotor of the signal transformer. This signal voltage is transmitted to the phase-sensitive amplifier 39, the output of which is applied to the precessing coil or coils 43 to precess the gyro and wipe out the error.

In the drawings, a flux valve 35, provided with an energizing coil 36, is shown as having three pick-up windings 35', displaced from each other by 120° and connected respectively to corresponding phase windings of a stator 37 of a "Selsyn" motor having a rotor 38 attached to pivot 17. The rotor winding is connected across both input terminals of phase-sensitive amplifier 39 of a known type having an output provided with three terminals connected by leads 40, 41 and 42 to precession coils 43, one of which is shown in the drawings and which have two opposed, normally balanced windings. The precessing coils cooperate with permanent magnets 9 mounted on gyroscope casing 10 for the purpose of exerting a torque about the axis 12—13 of the gyroscope, causing precession in azimuth in a known manner when an A. C. signal voltage is picked up by rotor 38, a rectified D. C. voltage of a polarity depending upon the phase of the A. C. signal being applied over leads 40 and 41, or 41 and 42 according to the direction in which the precession torque is to be exerted. A resistance 44 is included in circuit with the common or center tap lead 41 to reduce the amplifier output voltage and the precession torque to the proper value for slow smooth operation of the device under ordinary conditions. However, in the event that the aircraft is caused to climb, or dive, or bank nearly vertically, the gyroscope may get into gimbal lock position and be subject to violent precessional forces. This frequently causes the gyroscope to "tumble" or reverse the position of the vertical ring 14, so that the compass card thereon (not shown) reads 180° more or less off the magnetic meridian. Under such conditions (whether due to this cause or due to starting up in an incorrect position), the ordinary torque exerted by coils 43 would, without my invention, affect the return of the gyro at a rate of approximately four degrees per minute to its normal position which is undesirably slow.

By means of the present invention, after the airplane has gone through a maneuver such as to bring the gyro to a position approaching gimbal lock, a rapid precession torque is applied which quickly restores the gyro to normal position with respect to the meridian. This increased torque is created through the agency of a time delay mechanism which short-circuits resistance 44 and thus increases the voltage in precession coil 43 for a predetermined time, during which the gyroscope will have returned to normal position. The arrangement just referred to will now be more specifically described.

A contact operating arrangement shown diagrammatically as a cam disc 50 having oppositely disposed cam surfaces 51 formed on its edge is secured to pivot 12 with the cams lying in the same normally horizontal plane as the spin axis of the gyroscope. A cam follower in the form of a spring roller 52 operated by said cams is mounted on the vertical ring so as to be slightly spaced from the intermediate portions of disc 50 to avoid friction, cooperates with stationary contact 53 to operate a relay 54 from power leads 21 and 22 via the windings of the relay. Contacts 55 of the relay, when closed, operate from a source of direct current a solenoid 56 (Fig. 2) forming part of a time delay relay 56'. The plunger 57 of the solenoid is connected so as to rock bellcrank 58, which in turn imparts a rocking motion through link 59 to a lever 60 secured to shaft 61 of a suitable time delay mechanism 60' of which there are a number available on the market. A conducting section 62 on the lever cooperating with normally open stationary contact 63 is connected to one end of resistance 44 and contact 63 to the other, the arrangement being such that when the contacts are closed the resistance will be shunted thereby, resulting in an increased torque in coil 43.

When there exists a relative displacement of, say 10° or less between the spin axis 15 and vertical axis 16—17 of the gimbal ring, cam follower 52 will engage contact 53 and operate relay 54 which in turn operates solenoid 56 causing lever 60 to rock shaft 61 of the time delay mechanism and close contacts 62 and 63 as described above. Shaft 62 is retained in rocked position by the time delay mechanism in the known manner for a predetermined interval, for example, one to four minutes, during which time the gyroscope will have been precessed back to normal position at a rapid rate. At the expiration of the fixed interval the timing mechanism will release shaft 61 which will snap back to normal position rocking lever 60, opening contacts 62 and 63, whereupon resistance 44 is again in circuit and precession coil 43 operates in the normal manner.

In the event the spin axis of the gyroscope is tilted from its normal plane in excess of 90°, for example, 180°, the timing device will be actuated initially when the spin axis approaches an inclination likely to cause gimbal lock, i. e., an angle of 90° and thereafter the increased precession torque is exerted by the winding 43. When a cam 51 has passed under cam follower 52, the circuit through contact 53 is opened, and the time interval controlled by the timing device has started to run irrespective of the fact that the spin axis may still be moving away from its normal position. On its return movement toward its normal plane, a cam 51 will again raise the cam follower 52 to close with contact 53 a second time, thus resetting the timing mechanism. This arrangement insures that the accelerated precession rate will be applied continuously for a full time interval. It will be understood that any suitable contact device which operates with a minimum of friction may be used instead of the cam and contact mechanism shown in the drawings.

A modification of the circuits operated by the gyroscope in gimbal lock position is shown in Fig. 3. This circuit is for the purpose of additionally applying an increased torque about the vertical axis 16—17 for rapidly leveling the gyroscope. In connection with this modification it is assumed that a leveling circuit similar to that shown in Fig. 1 includes a resistance 64 at some suitable point, for example at X in the circuit for contact 27 of the leveling circuit for the purpose of reducing the current flowing therethrough to a suitable value for normal operating conditions.

Contacts 65 and 66 are connected to the circuit for contact 27 at opposite sides of resistance 64. Contacts 65 and 66 are shown as being assembled with contacts 62 and 63 in a contact nest in which the contacts of the respective pairs are normally open. Stud 67 of insulating material at the end of lever 60 engages contact 66 closing both pairs of contacts when the lever is rocked shunting both resistances 44 and 64. The shunting of resistance 64 causes an increased torque to be exerted by the windings of stator 33 while the shunting of resistance 44 causes an increased torque to be exerted by precessing coil 43 as already described. It is also self evident that the operator could set into operation the above-described cycle of quick resetting by momentarily closing switch 55 by hand, if desired.

This form of the invention also has the advantage that it may be used to prevent or tend to prevent the gimbal lock condition from being reached. Suppose, for instance, that the spin axis were fore and aft on the craft and that the aircraft had started to dive through a steeper and steeper angle until it approached a vertical dive. In this case, as the vertical dive is approached, which would result in gimbal lock, the contact 53 would be closed before the 90° position is reached, depending on the width of the cams 51. As soon as the contact is closed, an increased torque is exerted by the motor 33 about the axis 16—17 in a direction to cause the gyro axis to assume a right-angle position with respect to the plane of the ring.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus, my invention has utility not only for quickly correcting the position of the gyroscope after gimbal lock, or tending to prevent the same, but also it may, and frequently does, come into use in starting up the gyro-magnetic compass system. In starting up, it usually happens not only that the gyroscope is entirely out of synchronism with the magnetic compass, but that the spin axis is inclined at a substantial angle. In the latter case it will be evident that my quick synchronizing device will automatically be brought into operation, which not only quickly synchronizes the gyroscope with the compass, but also, in Fig. 3, quickly levels the gyroscope.

What is claimed is:

1. In a control system for a gyroscope, a support for the gyroscope, means for causing said gyroscope to precess at a predetermined rate, and means comprising a relay controlled by the displacement of the gyroscope in its support through a predetermined angular distance for causing the precession thereof at a different rate, and a timing device operatively associated with the last-mentioned means.

2. In a control system for a gyroscope, a vertical ring for the gyroscope, means for causing the rotor of said gyroscope to spin about its spin axis, means controlled by the tilt of the spin axis with respect to the vertical ring for imparting a precessional torque to the gyroscope tending to maintain it horizontal, a third means including a fourth means initially operated by a relative tilt of the spin axis through an abnormal angular distance for imparting an increased precession torque, and means initially operated by the third means for controlling said fourth means thereafter independently of the third means.

3. In a control system for a gyroscope, a support for the gyroscope, means for causing the rotor of said gyroscope to spin about its spin axis, means controlled by the shifting of said axis from a normal plane in the support for imparting a precessional torque to the gyroscope tending to maintain it in said normal plane, a relay operated by a shifting of the spin axis through a predetermined angular distance with respect to said normal plane, and means controlled by said relay for imparting an increased precession torque to the gyroscope.

4. In a control system for a gyroscope having a spin axis, a gimbal support for the gyroscope, means controlled by the relative tilt of said axis with respect to said support for imparting a precessional torque to the gyroscope to maintain said axis in a normal plane, a relay operated by such relative tilt approaching 90 degrees, a time delay mechanism operated by said relay, means controlled by said time delay mechanism for imparting an increased torque to the gyroscope, said time delay relay being adapted when once operated to control the last-mentioned means independently.

5. In a control system for a gyroscope having a spin axis, a gimbal support for the gyroscope, means controlled by the relative tilt of said support and axis for imparting a precessional torque to the gyroscope to maintain it in a normal position, a time delay relay, a switch for operating said relay, and means for controlling said torque means from said relay to impart an increased precessional torque to said gyroscope for a limited period.

6. In a control system for a gyroscope, a support for said gyroscope, means for causing said gyroscope to spin about its axis, precessing coil means, means controlled by the relative shifting of said support and axis for energizing said coil means imparting thereby a precessional torque to the gyroscope to maintain it in its normal plane, circuit means including a timing mechanism operated by abnormal relative tilt of the spin axis for causing an increased energization of said coil means thus increasing the precessional torque exerted thereby, and means whereby said timing mechanism when once operated controls said circuit means for a predetermined period independently of the position of the spin axis.

7. In a control system for a gyroscope, a support for the gyroscope, means for causing said gyroscope to spin about its axis, precessing coil means, means including a feed circuit controlled by the relative shifting of said support and axis for energizing said coil means imparting thereby a precessional torque to the gyroscope to maintain it in its normal plane, a contact device operated by the shifting of the spin axis approaching a condition causing gimbal lock, a relay operable by said contact device, a resistance element normally included in said feed circuit, and means controlled by said relay for shunting said resistance element thereby increasing the torque of the precessing coil means.

8. In a control system for a gyroscope, a support for the gyroscope, means for causing said gyroscope to spin about its axis, precessing coil means, means including a reference device including a feed circuit for energizing said coil means to impart a precessional torque to the gyroscope upon departure from the reference position of said device to maintain it in its normal plane, an auxiliary device, a time delay relay adapted to be operated by said auxiliary device, resistance means normally associated with said feed circuit, and means controlled by said relay for shunting said resistance means for a predetermined period to increase the effective torque of said precessing coil means.

9. In a control system for the directional gyroscope of a gyro-magnetic compass system, precessing coil means for maintaining the directional position of the gyroscope in the meridian, means controlled by the approaching of the gyroscope to gimbal lock position for causing the precessing coil means to exert an increased torque on the gyroscope to accelerate the return thereof to the meridian, a leveling device comprising torque motor for maintaining the gyroscope in a level position, and means controlled by the second-mentioned means for also increasing the torque of said torque motor.

10. In a control system for the directional gyroscope of a gyro-magnetic compass system, a magnetic compass, a circuit including an amplifier controlled thereby in accordance with the difference in azimuth between the magnetic meridian as sensed by the compass and the directional position of the gyroscope, precessing coil means energized from the output of the amplifier for maintaining the directional position of the gyroscope, an additional controller controlled by the approach of the gyroscope to gimbal lock position, circuit means controlled by the controller causing said precessing coil means to exert an increased torque on said gyroscope whereby the gyroscope is precessed at an accelerated rate toward the meridian.

11. In a control system for a slave directional gyroscope, a flux valve, a circuit including an amplifier controlled thereby in accordance with the difference in azimuth between the magnetic meridian as sensed by the flux valve and the directional position of the gyroscope, precessing coil means energized from the output of the amplifier for maintaining the directional position of the gyroscope, means controlled by the passing of the gyroscope through gimbal lock position, a relay operated by said last-named means, circuit means controlled by the relay for causing the precessing coil means to exert an increased torque for the purpose of restoring said gyroscope rapidly to a normal position, a leveling device comprising a torque motor adapted to maintain the gyroscope in level position and further circuit means controlled by said relay for increasing the torque of the torque motor.

12. In a gyroscope normally having freedom about two normally mutually perpendicular axes in its support in addition to its spin axis, means for exerting a weak torque about each of said first-named axes controlled by relative turning of the gyroscope and its support about the other of said axes, means for causing a greater torque to be exerted about at least one of said axes, and timing means for limiting the duration of said greater torque.

13. In a gyroscope normally having freedom about two normally mutually perpendicular axes in its support in addition to its spin axis, means for exerting a weak torque about each of said first-named axes controlled by relative turning of the gyroscope and its support about the other of said axes and means for causing a greater torque to be exerted about both of said axes upon relatively abnormal turning of the gyroscope and its support about an axis tending to cause gimbal lock.

14. In a gyroscope normally having freedom about two normally mutually perpendicular axes in its support in addition to its spin axis, means for exerting a weak torque about each of said first-named axes controlled by relative turning of the gyroscope and its support about the other of said axes and means for causing a greater torque to be exerted about at least one of said axes upon abnormally relative turning of the gyroscope and its support about an axis tending to cause gimbal lock, said last-named means including a timing mechanism for causing said increased torque to continue for a predetermined period after being initiated.

15. In a gyroscope normally having freedom about two normally mutually perpendicular axes in its support in addition to its spin axis, means for exerting a weak torque about each of said first-named axes controlled by relative turning of the gyroscope and its support about the other of said axes and means for causing a greater torque to be exerted about both of said axes, said last-named means including a timing mechanism for causing said increased torque to continue for a predetermined period after being initiated.

16. In a control system for a gyroscope, a support for the gyroscope, providing two degrees of freedom about normally perpendicular axes in addition to the spin axis, a standard of position, precessing coil means, means controlled by the relative shifting of the angular position of said standard of position and spin axis about one of said axes of freedom for energizing said coil means, imparting thereby a precessional torque to the gyroscope to maintain it in a normal position with respect to said standard of position and means operated by the relative shifting of the spin axis and support about the other of said two axes of freedom approaching gimbal lock for causing increased energization of said coil means to increase the rate of precession caused thereby.

17. In a control system for the directional or slave gyroscope of a gyro-magnetic compass system, precessing coil means for maintaining the directional position of the gyroscope on the meridian, a time delay relay for causing the precessing coil means to exert a temporarily increased torque on the gyroscope to accelerate the return thereof to the meridian, a leveling device comprising a torque motor for maintaining the gyroscope in a level position, and means controlled by the relay for also temporarily increasing the torque of said torque motor.

18. In a control system for the directional gyroscope of a gyro-magnetic compass system, a magnetic compass, a circuit including an amplifier controlled thereby in accordance with the difference in azimuth between the magnetic meridian as sensed by the compass and the directional position of the gyroscope, precessing coil means energized from the output of the amplifier for maintaining the directional position of the gyroscope, an additional controller including a timing device, circuit means controlled by the controller causing said precessing coil means to exert an increased torque on said gyroscope whereby the gyroscope is precessed at an accelerated rate toward the meridian for a predetermined interval.

19. In a gyroscope, electrical means for exerting a torque about an axis thereof to cause precession about a second axis at right angles thereto, a relatively weak input for exciting said electrical means to normally cause precession at a slow rate, means for temporarily increasing said input to cause precession at a more rapid rate, a switch for bringing into action said second means, and a time delay means for maintaining said increased input for a predetermined interval and thereafter reestablishing said weak input.

20. In a gyroscope normally having freedom about two normally mutually perpendicular axes in its support in addition to its spin axis, means for exerting a weak torque about each of said first-named axes controlled by relative turning of the gyroscope and its support about the other of said axes, means for causing a greater torque to be exerted about each of said axes, and timing means for reestablishing the weak torque.

21. In a control system for a gyroscope, supporting means for the gyroscope, a standard of position, means for causing the rotor of said gyroscope to spin about an axis, a second means effective upon the relative turning of said spin axis and said standard of position about a second axis to apply a relatively weak torque to the gyroscope to cause precession at a predetermined rate, and means including a time delay relay for causing a temporary increase in said torque for a predetermined interval, thereby causing precession at an accelerated rate for such interval.

ROBERT HASKINS, Jr.

REFERENCES CITED

The following references are of record in the file of this patent:

UNITED STATES PATENTS

| Number | Name | Date |
| --- | --- | --- |
| 1,228,061 | Schuler | May 29, 1917 |
| 1,982,636 | Carlson | Dec. 4, 1934 |
| 2,105,148 | Inglis | Jan. 11, 1938 |
| 2,383,409 | Newell | Aug. 21, 1945 |
| 2,389,158 | Lane et al. | Nov. 20, 1945 |